United States Patent
Araki et al.

(10) Patent No.: US 11,030,158 B2
(45) Date of Patent: *Jun. 8, 2021

(54) IMPROVING PERFORMANCE OF ASYNCHRONOUS REPLICATION IN HSM INTEGRATED STORAGE SYSTEMS

(71) Applicant: International Business Machines Corporation, Armonk, NY (US)

(72) Inventors: Hiroshi Araki, Yokohama (JP); Thomas W. Bish, Tucson, AZ (US); Norie Iwasaki, Kanagawa (JP); Hiroyuki Miyoshi, Kanagawa (JP); Satoshi Takai, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 467 days.

This patent is subject to a terminal disclaimer.

(21) Appl. No.: 15/857,396

(22) Filed: Dec. 28, 2017

(65) Prior Publication Data

US 2018/0121464 A1  May 3, 2018

Related U.S. Application Data

(63) Continuation of application No. 14/466,531, filed on Aug. 22, 2014, now Pat. No. 9,886,447.

(51) Int. Cl.
*G06F 3/06* (2006.01)
*G06F 16/178* (2019.01)
(Continued)

(52) U.S. Cl.
CPC .............. *G06F 16/178* (2019.01); *G06F 3/06* (2013.01); *G06F 3/0604* (2013.01);
(Continued)

(58) Field of Classification Search
CPC ........... G06F 16/24542; G06F 16/2462; G06F 3/0647; G06F 3/0649
See application file for complete search history.

(56) References Cited

U.S. PATENT DOCUMENTS 5,832,523 A  11/1998  Kanai et al.
6,330,572 B1  12/2001  Sitka
(Continued)

OTHER PUBLICATIONS

Miyoshi et al. "Performance Improvement of SONAS Asynchronous Replication", 2011, ProVISION. (Year: 2011).*

(Continued)

*Primary Examiner* — Sheryl L Holland
(74) *Attorney, Agent, or Firm* — Stephen R. Tkacs; Stephen J. Walder, Jr.; Robert M. Sullivan

(57) ABSTRACT

A mechanism is provided in a data processing system for asynchronous replication in a hierarchical storage management integrated storage system. For a given file to be replicated from a primary storage system to a remote storage system, the primary storage system accesses the remote storage system to determine file existence and migration status at the remote storage system for the given file. Responsive to the primary storage system determining that the given file exists and has been migrated from first tier storage to second tier storage at the remote storage system, the primary storage system determines a first performance penalty for file recall and a second performance penalty for sending excess data from the primary storage system to the remote storage system. Responsive to the primary storage system determining that the first performance penalty is greater than the second performance penalty, the primary storage system sends whole file data for the given file to the remote storage system to replicate the given file at the remote storage system.

20 Claims, 7 Drawing Sheets

(51) Int. Cl.
*G06F 16/182* (2019.01)
*G06F 16/27* (2019.01)
*G06F 16/185* (2019.01)

(52) U.S. Cl.
CPC .......... *G06F 3/0649* (2013.01); *G06F 3/0685* (2013.01); *G06F 16/184* (2019.01); *G06F 3/0647* (2013.01); *G06F 16/185* (2019.01); *G06F 16/27* (2019.01)

(56) References Cited

U.S. PATENT DOCUMENTS

| | | | |
|---|---|---|---|
| 7,343,446 | B2 | 3/2008 | Pudipeddi et al. |
| 7,853,667 | B1 | 12/2010 | Yoder |
| 8,055,864 | B2 | 11/2011 | Sawdon et al. |
| 2005/0050231 | A1 | 3/2005 | Williams |
| 2005/0138081 | A1* | 6/2005 | Alshab ................. G06Q 10/06 |
| 2007/0028139 | A1 | 2/2007 | Wahl et al. |
| 2007/0033340 | A1 | 2/2007 | Tulskie et al. |
| 2009/0037479 | A1* | 2/2009 | Bolik ................. G06F 16/185 |
| 2009/0070313 | A1* | 3/2009 | Beyer ................. G06F 16/24 |
| 2009/0271412 | A1 | 10/2009 | Lacapra et al. |
| 2010/0332401 | A1 | 12/2010 | Prahlad et al. |
| 2011/0145494 | A1 | 6/2011 | Mitsuma et al. |
| 2011/0153965 | A1 | 6/2011 | Haustein et al. |
| 2012/0079223 | A1 | 3/2012 | Jaquette |
| 2012/0096054 | A1* | 4/2012 | Egan ................. G06F 16/9574 707/812 |
| 2012/0150826 | A1* | 6/2012 | Vijayan Retnamma ................. G06F 3/067 707/692 |
| 2012/0203742 | A1 | 8/2012 | Goodman et al. |
| 2013/0031211 | A1 | 1/2013 | Johnson et al. |
| 2013/0254166 | A1* | 9/2013 | Kottomtharayil ..... G06F 3/0619 707/655 |
| 2014/0006357 | A1 | 1/2014 | Davis et al. |
| 2014/0067764 | A1 | 3/2014 | Prahlad et al. |

OTHER PUBLICATIONS

List of IBM Patents or Patent Applications Treated as Related, Dec. 28, 2017, 2 pages.

Gotlieb, C. C. et al., "Performance of Movable-Head Disk Storage Devices", Journal of the Association for Computing Machinery, vol. 24, No. 4, Oct. 1973, pp. 604-623.

Johnson, Theodore et al., "Performance Measurements of Tertiary Storage Devices", Very Large Database (VLDB), Proceedings of the 24th VLDB Conference, New York, vol. 98, Aug. 24, 1998, pp. 50-61.

Miyoshi, Hiroyuki et al., "Performance Improvement of SONAS Asynchronous Replication", IBM Professionals' Papers 2, Provision No. 70, Summer 2011, pp. 90-96. Abstract Only.

Miyoshi, Hiroyuki et al., "Performance Improvement of SONAS Asynchronous Replication", ProVISION, Issue 70, Translation of Japanese Document, Summer 2011, pp. 90-96.

\* cited by examiner

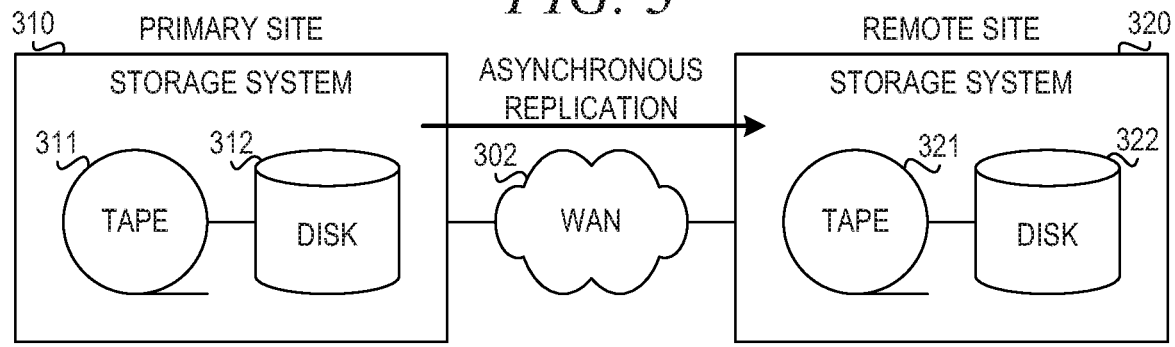
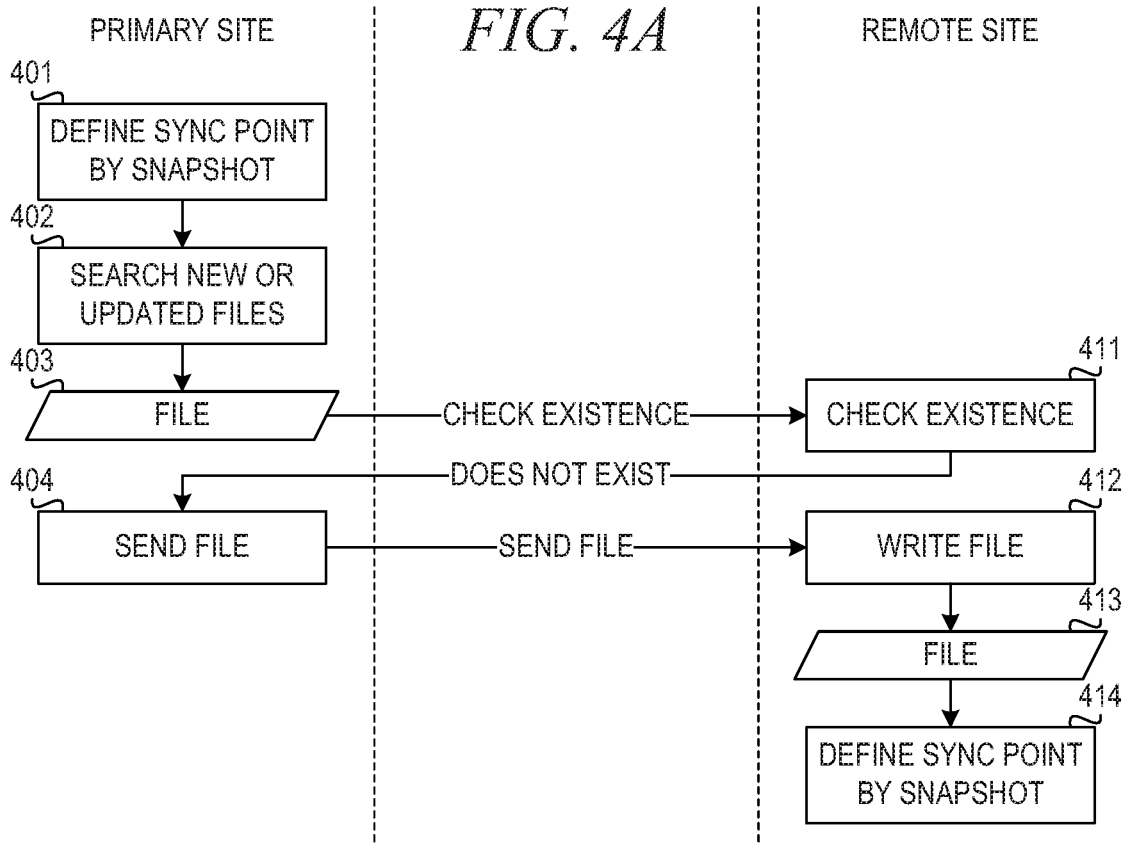

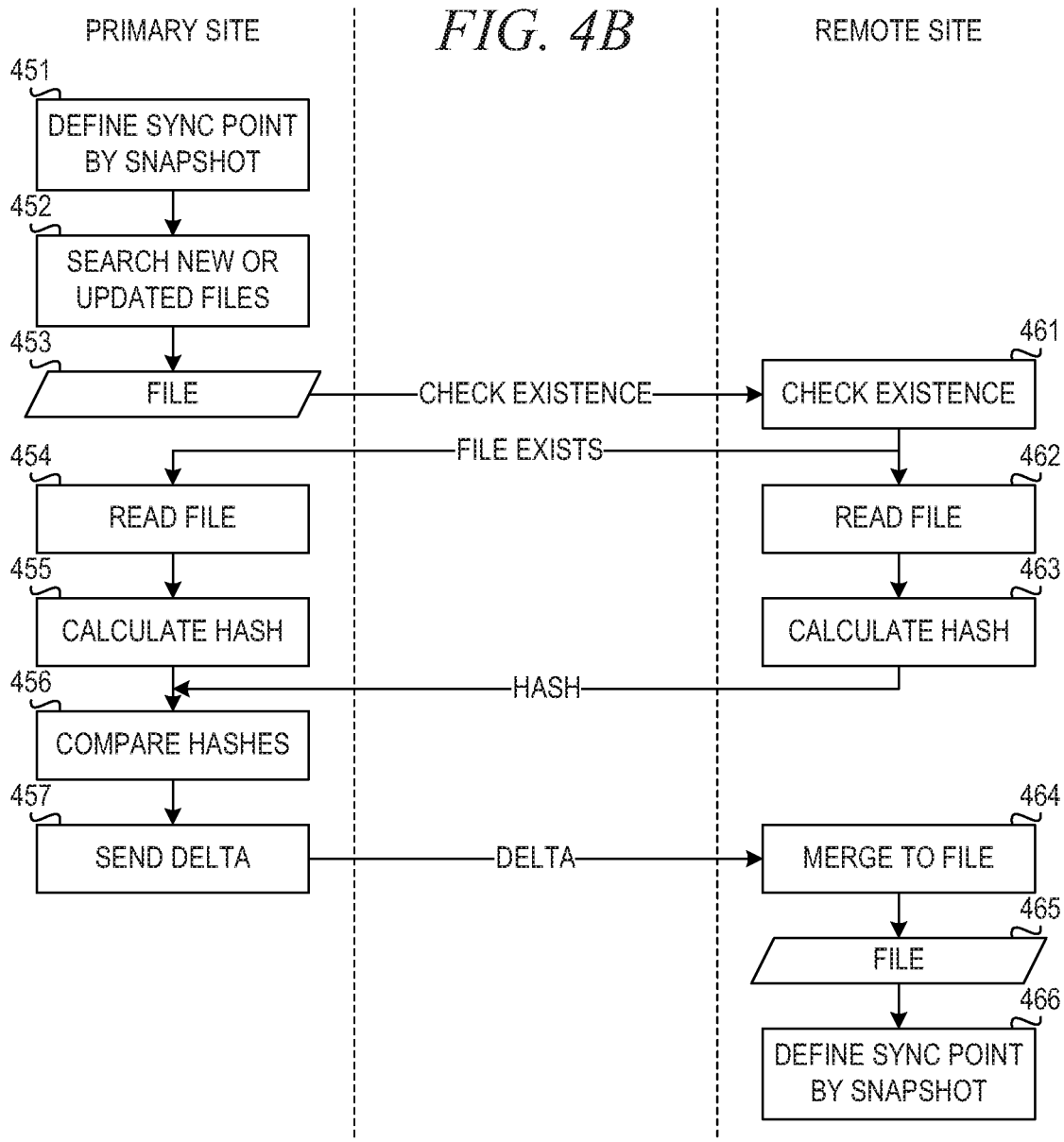

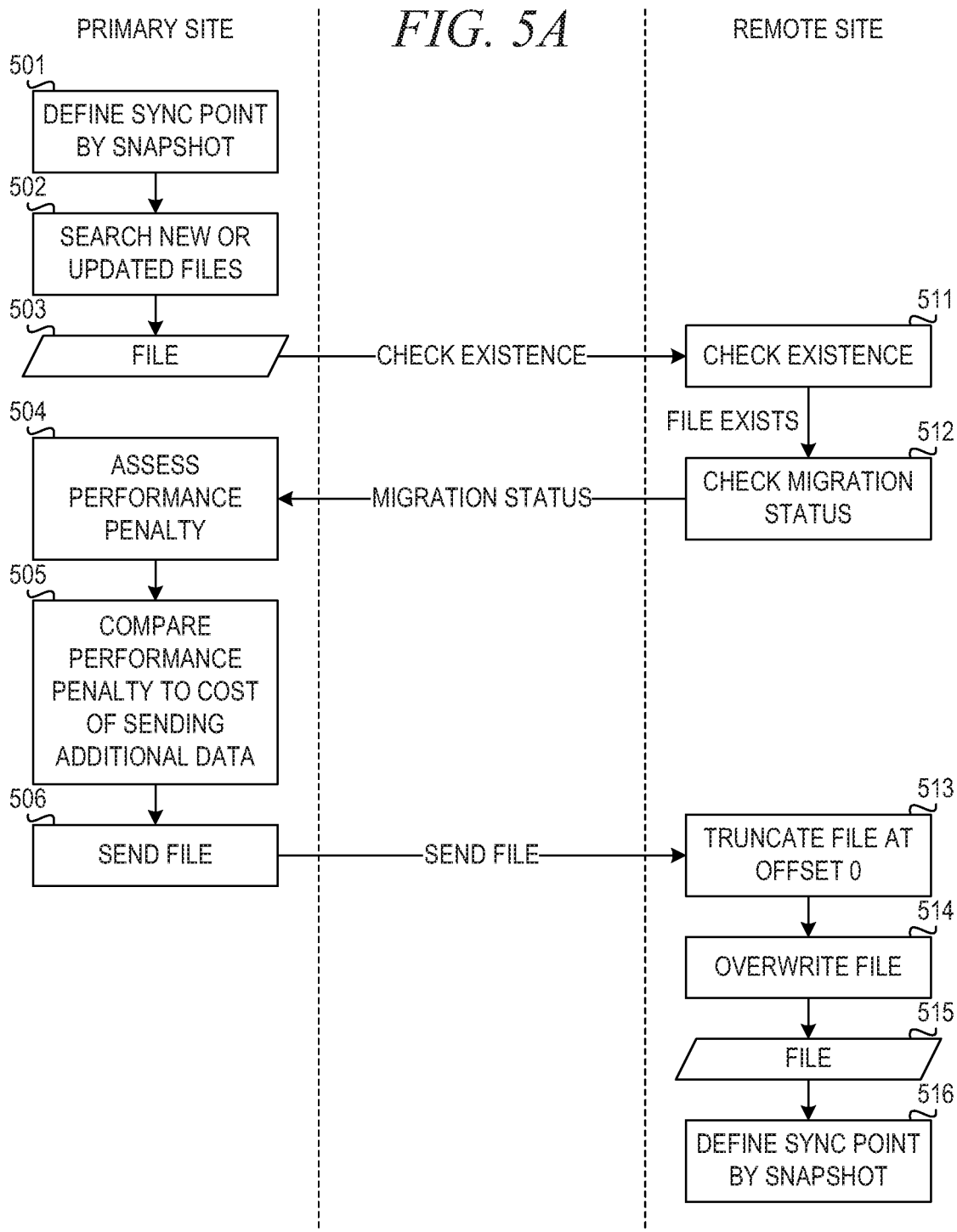

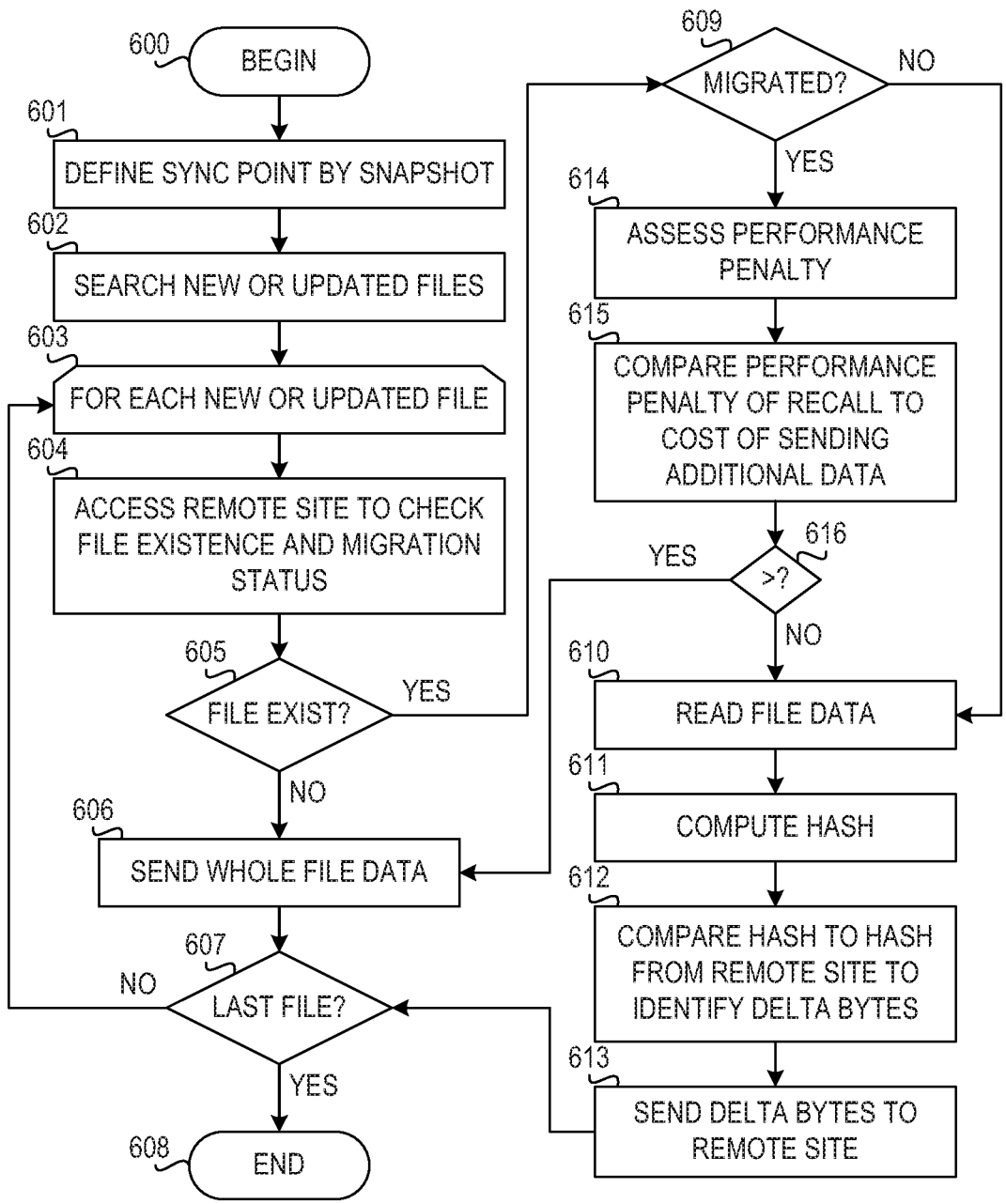

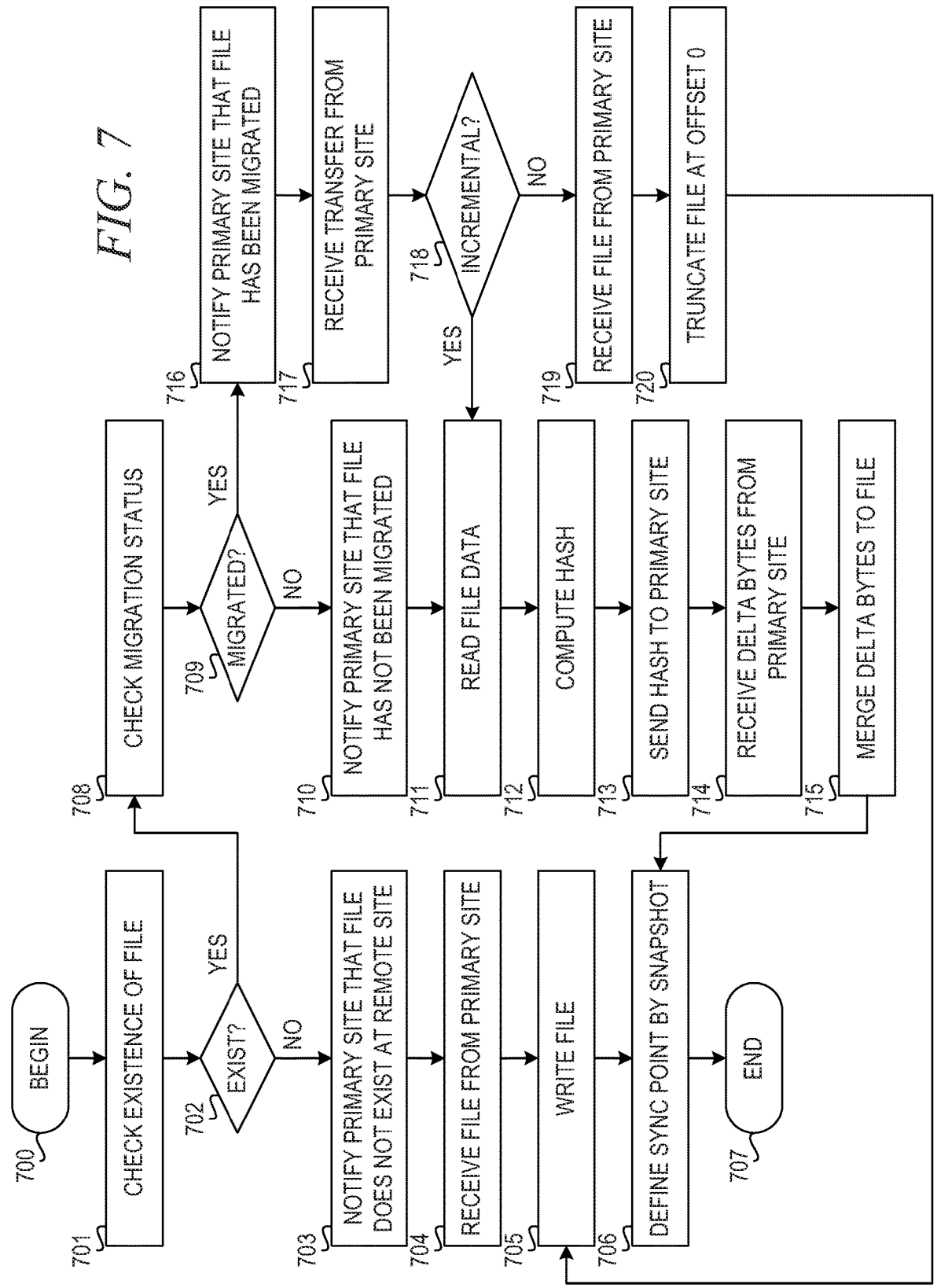

IMPROVING PERFORMANCE OF ASYNCHRONOUS REPLICATION IN HSM INTEGRATED STORAGE SYSTEMS

BACKGROUND

The present application relates generally to an improved data processing apparatus and method and more specifically to mechanisms for improving performance of asynchronous replication in hierarchical storage management (HSM) integrated storage systems.

Hierarchical storage management (HSM) is a data storage technique that automatically moves data between high-cost and low-cost storage media. HSM is sometimes referred to as tiered storage. HSM systems exist because high-speed storage devices, such as hard disk drive arrays, are more expensive (per byte stored) than slower devices, such as optical discs and magnetic tape drives. While it would be ideal to have all data available on high-speed devices all the time, this is prohibitively expensive for many organizations. Instead, HSM systems store the bulk of the enterprise's data on slower devices, and then copy data to faster disk drives when needed. In effect, HSM turns the fast disk drives into caches for the slower mass storage devices. The HSM system monitors the way data is used and makes best guesses as to which data can safely be moved to slower devices and which data should stay on the fast devices.

In a typical HSM scenario, data files that are frequently used are stored on hard disk drives (HDDs), or in some cases solid state drives (SSDs), but are eventually migrated to tape if they are not used for a certain period of time, such as a few months. If a user does reuse a file that is on tape, it is automatically moved back to disk storage. The advantage is that the total amount of stored data can be much larger than the capacity of the disk storage available, but since only rarely used files are on tape, most users will usually not notice any slowdown.

A basic method of storage replication is disk mirroring, typical for locally-connected disks. A replication is extendable across a computer network, so the disks can be located in physically distant locations, and a master-slave database replication model is usually applied. A purpose of replication is to prevent damage from failures or disasters that may occur in one location, or in case such events do occur, improve the ability to recover. For replication, latency is a key factor because latency determines either how far apart the sites can be or the type of replication that can be employed.

Synchronous replication guarantees "zero data loss" by the means of atomic write operations, i.e., a write either completes on both sides or not at all. A write is not considered complete until completion of the write operation is acknowledged by both the primary storage and the remote storage. Most applications wait for a write transaction to complete before proceeding with further work; therefore, overall performance decreases considerably. Inherently, performance drops proportionally to distance.

In asynchronous replication, a write is considered complete as soon as the primary storage acknowledges completion. Remote storage is updated, but probably with a small lag. Performance is greatly increased relative to synchronous replication, but in case of losing a local storage, the remote storage is not guaranteed to have the current copy of data and most recent data may be lost.

SUMMARY

In one illustrative embodiment, a method, in a data processing system, is provided for asynchronous replication in a hierarchical storage management integrated storage system. The method comprises, for a given file to be replicated from a primary storage system to a remote storage system, accessing the remote storage system to determine file existence and migration status at the remote storage system for the given file. The method further comprises, responsive to the primary storage system determining that the given file exists and has been migrated from first tier storage to second tier storage at the remote storage system, determining a first performance penalty for file recall and a second performance penalty for sending excess data from the primary storage system to the remote storage system. The method further comprises, responsive to the primary storage system determining that the first performance penalty is greater than the second performance penalty, sending whole file data for the given file from the primary storage system to the remote storage system to replicate the given file at the remote storage system.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 3 is a block diagram illustrating storage systems that use hierarchical storage management and asynchronous replication in accordance with an illustrative embodiment;

FIGS. 4A and 4B are data flow diagrams illustrating operation of incremental asynchronous replication in accordance with an illustrative embodiment;

FIGS. 5A and 5B are data flow diagrams illustrating operation of incremental asynchronous replication based on migration performance penalty in accordance with an illustrative embodiment;

FIG. 6 is a flowchart illustrating operation of a primary storage system performing asynchronous replication in accordance with an illustrative embodiment; and FIG. 7 is a flowchart illustrating operation of a remote storage system performing asynchronous replication in accordance with an illustrative embodiment.

DETAILED DESCRIPTION

Figure 1:
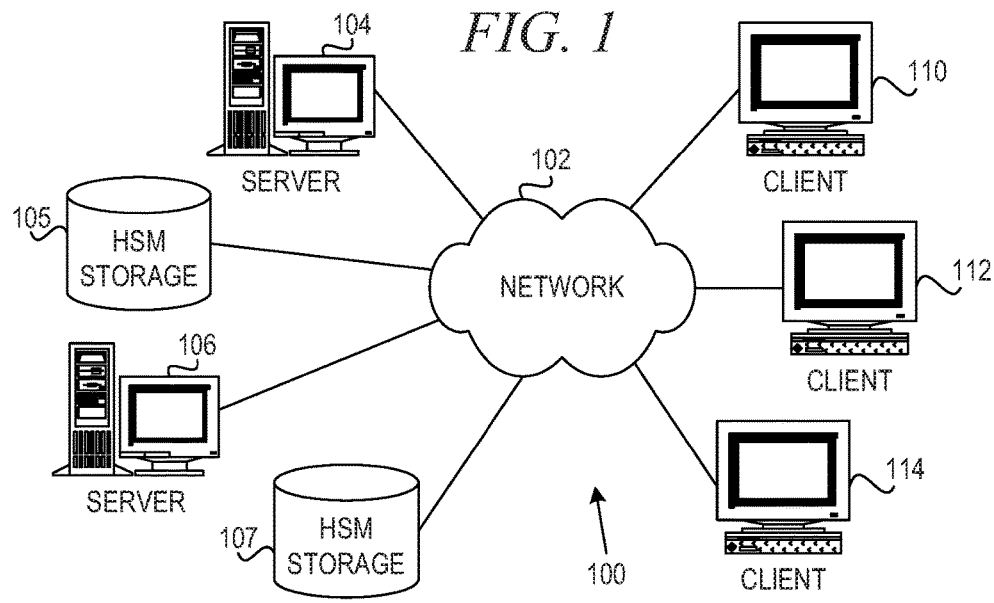
FIG. 1 depicts a pictorial representation of an example distributed data processing system in which aspects of the illustrative embodiments may be implemented.

Many enterprise storage systems support HSM. When using HSM, multiple tiers of storage media are installed in the storage system. For example, the first tier can comprise high-cost, fast storage media, such as solid state drives (SSDs), while the second tier can comprise low-cost storage media, such as tapes. An HSM integrated storage system automatically migrates data from the first tier to the second tier based on policies, such as access frequency and file size. The storage system creates a stub file in the first tier and performs migration transparent to the user. If the user then attempts to access the migrated file, the storage system recalls the data from the second tier and provides access to the file in the first tier to the user.

HSM is a technique to lower the storage cost but still maintain the I/O performance as much as possible by placing frequently accessed files on disks. If excessive recalls occur, the tape mount takes a long time and the I/O response time significantly degrades. It is important to have appropriate data migration policy and in many cases least recently used (LRU) policy is used as the main factor. An LRU policy examines access times of files and selects least recently used files to migrate to the second tier.

Many enterprise storage systems also support file-based asynchronous replication for disaster recovery solution. Asynchronous replication copies the primary storage data to the remote storage system. If a disaster occurs on the primary site, customers are still able to continue business using the remote storage system. Often, the remote storage system is used as read-only.

The illustrative embodiments attempt to use HSM and asynchronous replication at the same time. In one embodiment, HSM runs on both the primary site and the remote site, and asynchronous replication copies from the primary site to the remote site. HSM runs independently per site. The file location with regard to storage media (i.e., the tier) is independent per site. On each site, a file that has been recently accessed will be on the first tier.

On the primary site, the asynchronous replication reads data on the updated files. Since these files have been recently updated by users, there is a good chance that the file data are on disk so the read performance is not a problem. However, at the remote site, there may be a performance issue, because asynchronous replication may read files that have been migrated to tape because HSM runs independently between the sites. If many files are migrated, excessive recalls occur, which significantly degrade the performance of the replication. If replication performance degrades, then replication may not complete before the next replication. The recovery point objective may prolong, and the customer may be faced with a risk of losing more data in case of disaster.

The illustrative embodiments attempt to avoid recalls on the remote site by considering the migration status of the remote files. For each file, the primary site communicates with the remote site to check the migration status of the file. If the file exists on the remote site and is migrated, the primary site storage system considers the recall penalty versus the penalty of sending excess data over the network. If the primary storage system determines the recall penalty is larger than the penalty of sending excess file data, then the primary storage system transfers the whole file to the remote site. If the primary storage system determines the recall penalty is less than the penalty of sending excess file data, then the primary storage system uses an incremental mode to send only those portions of the file that have changed to the remote site. In this case, the storage system at the remote site merges the changed file portions with the recalled file.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a," "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 2:
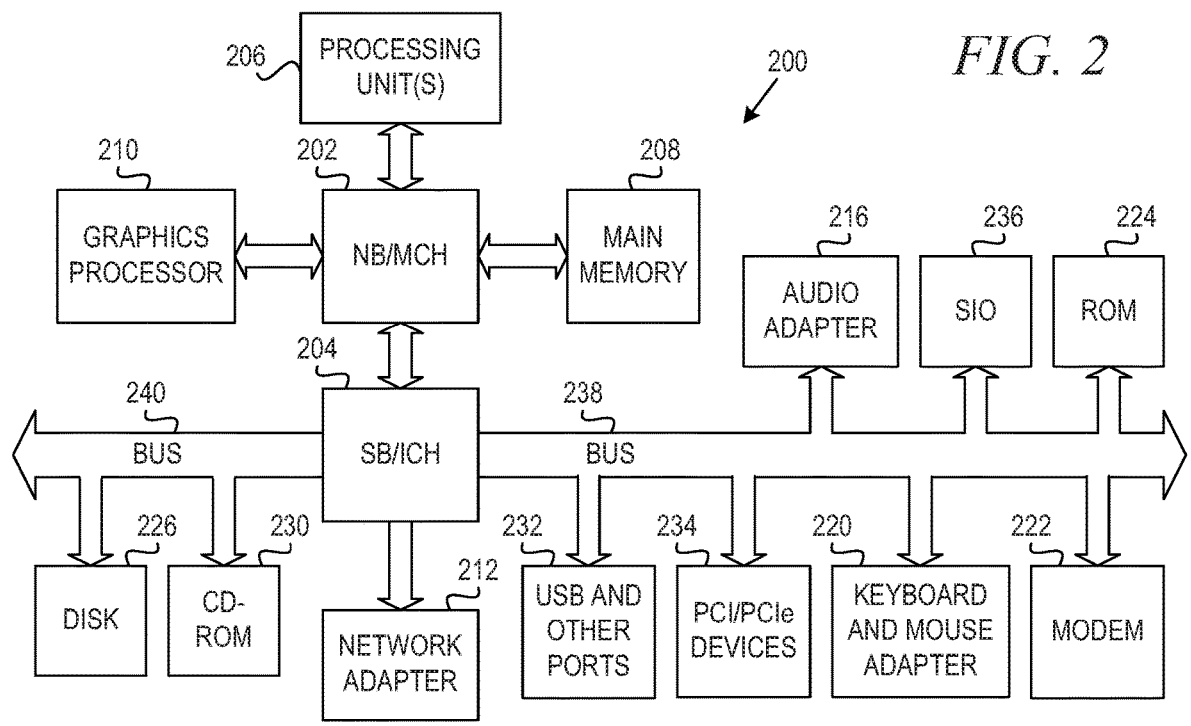
FIG. 2 is a block diagram of an example data processing system in which aspects of the illustrative embodiments may be implemented.

The illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

Servers 104, 106 access hierarchical storage management (HSM) storage systems 105, 107. In one embodiment, server 104 accesses HSM storage system 105 as a primary, local storage system, and server 106 accesses HSM storage system 107 as a primary, local storage system. In accordance with the illustrative embodiment, HSM storage systems 105, 107 support file-based asynchronous replication. Thus, HSM storage system 105 asynchronously replicates files to HSM storage system 107, which is a remote storage system with respect to HSM storage system 105. Similarly, HSM storage system 107 asynchronously replicates files to HSM storage system 105, which is a remote storage system with respect to HSM storage system 107. As used herein, the word "remote" may refer to physical distance or network configuration or, in one alternative embodiment, merely the distinction that the remote storage system is secondary to the primary.

FIG. 2 is a block diagram of an example data processing system in which aspects of the illustrative embodiments may be implemented. Data processing system 200 is an example of a computer, such as client 110, 112, 114, server 104, 106, or a storage system controller in HSM storage system 105, 107 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System P® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

FIG. 3 is a block diagram illustrating storage systems that use hierarchical storage management and asynchronous replication in accordance with an illustrative embodiment. Storage system 310 at the primary site and storage system 320 at the remote site connect to wide area network (WAN) 302. At the primary site, storage system 310 uses hierarchical storage management (HSM) to read recently or frequently accessed files from tape 311 to disk 312 and to migrate files from disk 312 to tape 311 according to a migration policy. For example, storage system 310 may migrate a file from disk 312 to tape 311 if a predetermined period of time expires without the user or customer accessing the file or according to a least recently used (LRU) policy. Similarly, at the remote site, storage system 320 uses HSM to read recently or frequently accessed files from tape 321 to disk 322 and to migrate files from disk 322 to tape 321 according to a migration policy.

Also, according to the illustrative embodiment, primary storage system 310 performs asynchronous replication with remote storage system 320. In this embodiment, asynchronous replication is file-based replication. That is, when a file is created or updated at the primary site, storage system 310, the file is replicated at the remote site, storage system 320. In a basic embodiment, for any new or updated file at storage system 310, the primary site sends the whole file to the remote site.

In another embodiment, the storage system at the primary site sends incremental data to the remote site to minimize the network transfer to improve replication performance. FIGS. 4A and 4B are data flow diagrams illustrating operation of incremental asynchronous replication in accordance with an illustrative embodiment. With reference to FIG. 4A, at the primary site, the primary storage system defines a synchronization point by taking a snapshot (block 401). In computer systems, a snapshot is the state of a system at a particular point in time. The primary storage system searches for files that have been created or updated since the last synchronization time (block 402). The storage system may search by looking at Portable Operating System Interface (POSIX) timestamps (e.g., mtime and ctime). POSIX is a family of standards specified by the Institute of Electrical and Electronics Engineers (IEEE) for maintaining compatibility between operating systems. POSIX defines the application programming interface (API), along with command line shells and utility interfaces, for software compatibility with variants of Unix and other operating systems.

For a new file 403, the primary storage system accesses the remote site to determine whether the file exists in the remote storage system (block 411). In the depicted example, the file does not exist at the remote site, and the primary storage system sends the whole file to the remote storage system (block 404). The remote storage system writes the file (block 412) to form file 413, which is a replicated copy of file 403. The remote storage system then defines a synchronization point by taking a snapshot (block 414).

FIG. 4B illustrates another example for a file that has been updated at the primary site. The primary storage system defines a synchronization point by taking a snapshot (block 451). The primary storage system then searches for new or updated files (block 452). For updated file 453, the primary storage system accesses the remote site to determine whether the file exists at the remote storage system (block 461).

In the depicted example, the file exists at the remote site, and the primary storage system reads the file (block 454) and calculates a hash for all blocks of the file (block 455). At the remote site, the remote storage system reads the file (block 462) and calculates a hash of the file (block 463). At the remote site, the storage system calculates a hash value for each data block of the file.

The remote storage system sends the hash of the file to the primary site, and the primary storage system compares the hashes (block 456). Based on the comparison of the hash values, the primary storage system determines the updated bytes, i.e., the delta, and sends the delta to the remote storage system (block 457). That is, for each data block, the primary storage system determines whether the hash value for the data block calculated by the primary storage system in block 455 matches the hash value for the data block calculated by the remote storage system in block 463. If the hash values do not match, then the given data block has changed. The delta comprises those data blocks that have changed at the primary site with respect to the state of the data blocks stored at the remote site.

The remote storage system receives the delta and merges the changed data blocks to the file (block 464) to form file 465, which is a replicated copy of file 453. Thereafter, the remote storage system defines a synchronization point by taking a snapshot (block 466).

The schedule and frequency of asynchronous replication depends on the customer operation. To avoid network/disk/processor impact to the front of I/O, daily replication may be started at night time.

At the primary site, the asynchronous replication reads the data of the updated files. Because these files have been updated recently by users, there is a good chance that the file data are on disk; therefore, the read performance will not be a problem. However, asynchronous replication reads the file at the remote site, but the file may be migrated to the second tier because HSM is running independently between the primary site and the remote site. If many files are migrated at the remote site, excessive recalls occur, which may significantly degrade performance of the replication.

Figure 5B:
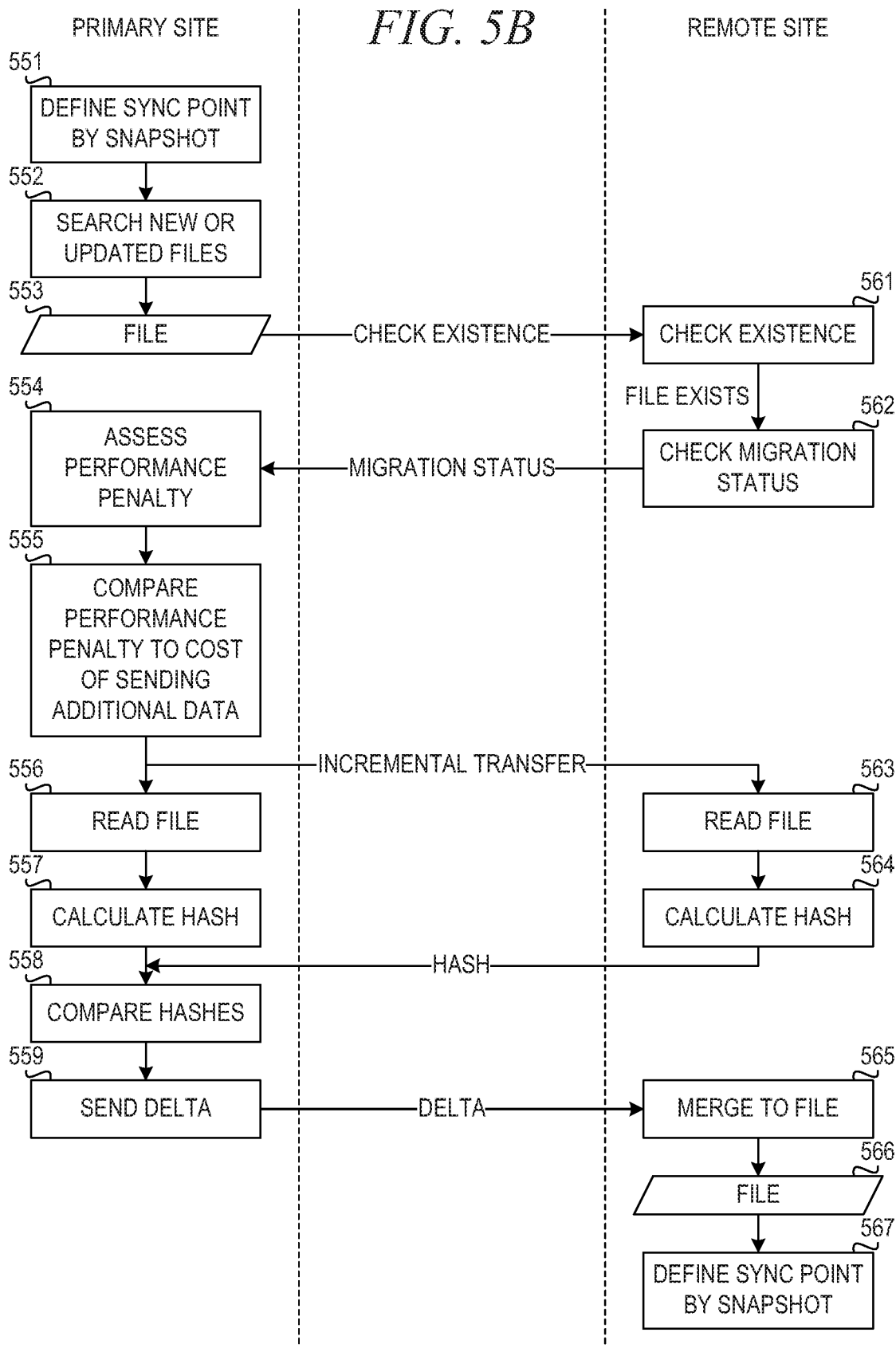

FIGS. 5A and 5B are data flow diagrams illustrating operation of incremental asynchronous replication based on migration performance penalty in accordance with an illustrative embodiment. With reference to FIG. 5A, the primary storage system defines a synchronization point by taking a snapshot (block 501). The primary storage system then searches for new or updated files (block 502). For updated file 503, the primary storage system accesses the remote site to determine whether the file exists at the remote storage system and whether the file is migrated to the second tier (block 511).

In the depicted example, the file exists at the remote site, and the remote storage system checks whether the file is migrated to second tier storage (block 512). If the file is not migrated to second tier storage, the asynchronous replication may be performed as a whole-file replication as described above with respect to FIG. 4A or as an incremental replication as described above with respect to FIG. 4B.

In the depicted example, the file is migrated to second tier storage. The primary storage system assesses the performance penalty of a recall from second tier storage to first tier storage at the remote site and the penalty of sending more data over the network (block 504). The primary storage system compares the performance penalty of a recall to the penalty of sending more data over the network (block 505) to determine whether to perform a whole-file replication or an incremental replication.

In the depicted example, the performance penalty of a recall is greater than the penalty of sending more data over the network.

The primary storage system sends the entire file to the remote site (block 506). The remote storage system receives the entire file from the primary storage system. The remote storage system truncates the file at offset 0 (zero) (block 513), marking the end of the file at the very beginning of the file, making the file empty. This ensures no recall will be triggered for the file. The remote storage system overwrites the file (block 514) to form file 515, which is a replicated copy of file 503. Thereafter, the remote storage system defines a synchronization point by taking a snapshot (block 516).

Turning to FIG. 5B, the primary storage system defines a synchronization point by taking a snapshot (block 551). The primary storage system then searches for new or updated files (block 552). For updated file 553, the primary storage system accesses the remote site to determine whether the file exists at the remote storage system and whether the file is migrated to the second tier (block 561).

In the depicted example, the file exists at the remote site, and the remote storage system checks whether the file is migrated to second tier storage (block 562). In the depicted example, the file is migrated to second tier storage. The primary storage system assesses the performance penalty of a recall from second tier storage to first tier storage at the remote site and the penalty of sending more data over the network (block 554). The primary storage system compares the performance penalty of a recall to the penalty of sending more data over the network (block 555) to determine whether to perform a whole-file replication or an incremental replication.

In the depicted example, the performance penalty of a recall is less than the penalty of sending more data over the network. The primary storage system reads the file (block 556) and calculates a hash for each block of the file (block 557). At the remote site, the remote storage system reads the file (block 563) and calculates a hash of the file (block 564). At the remote site, the storage system calculates a hash value for each data block of the file.

The remote storage system sends the hash of the file to the primary site, and the primary storage system compares the hashes (block 558). Based on the comparison of the hash values, the primary storage system determines the updated bytes, i.e., the delta, and sends the delta to the remote storage system (block 559). That is, for each data block, the primary storage system determines whether the hash value for the data block calculated by the primary storage system in block 557 matches the hash value for the data block calculated by the remote storage system in block 564. If the hash values do not match, then the given data block has changed. The delta comprises those data blocks that have changed at the primary site with respect to the state of the data blocks stored at the remote site.

The remote storage system receives the delta and merges the changed data blocks to the file (block 565) to form file 566, which is a replicated copy of file 553. Thereafter, the remote storage system defines a synchronization point by taking a snapshot (block 567).

In one alternative embodiment, if the file on the remote storage system is migrated to second tier storage, then the primary storage system sends the whole file regardless of the performance penalty for recall. Also, the customer may specify that no recalls should be triggered by the replication task.

In one embodiment, the primary storage system attempts to compare the penalty of sending extra data over the network versus the penalty of recalling the remote file. The recall penalty is the recall time, which consists of mount time plus seek time plus data read time, plus the overhead of calculating the hash and sending the hash to the source to find out the delta. If the network penalty is less than the recall penalty, then the primary storage system sends the whole file. If the network penalty is greater than the recall penalty, then the primary storage system uses incremental replication.

The detail values for an implementation example are as follows:

the entire file size of the updated file at the primary site (S_fnew bytes);

the network transfer throughput obtained from the past replications (R_net bytes/second);

the time it would take to mount the cartridge on the tape drive (second tier storage) on the remote site (T_mnt seconds) (This is obtained from the HSM utility and tape library. If it is not available, the primary storage system uses the average mount time.);

the time it would take to seek the file in the cartridge (T_seek seconds) (The physical volume (PVOL) offset is obtained from the HSM utility. If it is not available, the primary storage system uses the worst case for a given cartridge.);

the tape read throughput (R_taprd bytes/second) (This is obtained from the past tape I/O.);

the file size of the file on tape (S_fold bytes) (this is the size of the file before the update);

the average time to calculate a hash of a block size on the primary site (T_hashpri seconds, the block size to calculate the hash:S_hashblk bytes)

the average time to calculate a hash of a block size on the remote site (T_hashrem seconds, the block size to calculate the hash:S_hashblk bytes); and the size of the calculated hash (S_hash).

The illustrative embodiments use the amount of delta (S_delta bytes) for calculation. However, the delta cannot be obtained until the remote file is read. To estimate the penalty of sending a whole file over the network, the worst case is chosen by assuming only one bit has been changed at the primary site. When switched to the whole file transfer, nearly all data would be the extra data sent over the network.

The primary storage system calculates the network extra time as follows: (S_fnew/R_net). The primary storage system calculates the recall time at the remote site as follows: (T_mnt+T_seek+S_fold/R_taperd).

Also, by switching to the whole file transfer, the overhead of finding the delta is saved. The overhead mainly consists of calculating hash on both sides. In one example embodiment, the remote side hash is calculated per given block. The remote side hash calculation time is determined as follows: (T_hashrem*(S_fold/S_hashblk)). The primary side depends on how much data have been changed. Considering the case of almost no changes at the primary site, the primary hash calculation time is determined as follows: (T_hashpri*(S_fnew/S_hashblk)).

In one embodiment, the time to transfer the calculated hash from the remote site to the primary site is determined as follows: (S_hash*(S_fold/S_hashblk)/R_net).

Therefore, if (S_fnew/R_net)<((T_mnt+T_seek+S_fold/R_taperd)+(T_hashpri*(S_fnew/S_hashblk))+(T_hashrem*(S_fold/S_hashblk))+((S_hash*(S_fold/S_hashblk)/R_net)), then the primary storage system sends the whole file; otherwise, the primary storage system uses incremental file transfer.

HSM is constantly running; therefore, there can be a narrow window immediately after the primary site has queried the migration status of a file that the migration status may change at the remote site. This may cause recalls. In a specific scenario, a file is on disk at the remote site and immediately after the primary storage system queries the migration status, the file is migrated to tape. In this case, the primary storage system moves on to incremental replication and attempts to read the remote file to find out the delta, resulting in a recall. The window should be narrow; however, the primary site may pin the file on disk at the remote site until the replication completes, if such a feature is supported by the HSM utility and desired by the customer.

The illustrative embodiments focus on an implementation that reads both the primary and the remote data to find out the delta. In an alternative embodiment, the primary storage system determines the delta without accessing the remote site. In one case, the previous and the current synchronization points are maintained on the primary site and the difference can be taken between the previous and current versions of the file. In another case, the file system of the storage has a special journaling feature that provides the delta of a file between two synchronization points.

Even in the above cases, the excessive recalls on the remote site when using the HSM utility may well happen because the incremental data must be merged to the files on the remote storage system. To merge, if the file is migrated to tape, the file must first be recalled before the delta is merged to form the updated file. Thus, the illustrative embodiments may be applied to avoid such excessive recalls.

Furthermore, in this case, the determination logic of incremental versus whole file transfer may be more accurate because the amount of delta (S_delta bytes) can be obtained. The logic compares the time to send the extra data over the network ((S_filenew−S_delta)/R_net) with the time it takes to recall the remote file (T_mnt+T_seek+S_fold/R_taperd). If the recall time is larger, then the primary storage system sends the whole file, as described above with reference to FIG. 5A.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

FIG. 6 is a flowchart illustrating operation of a primary storage system performing asynchronous replication in accordance with an illustrative embodiment. Operation begins for an iteration of asynchronous replication (block 600). The primary storage system defines a synchronization point by taking a snapshot (block 601). The primary storage system searches for new or updated files in the primary storage system (block 602). In one example embodiment, the primary storage system searches for new or updated files by comparing the snapshot to the previous snapshot. Using the principles of hierarchical storage management (HSM), any new or updated file is found in the first tier, e.g., hard disk drives (HDD) or solid state drives (SSDs).

For each new or updated file (block 603), the primary storage system accesses the remote site to check the existence and migration status of the file in the remote storage system (block 604). The primary storage system determines whether the file exists at the remote site (block 605). If the file does not exist at the remote site, the primary storage system sends the whole file to the remote storage system (block 606).

The primary storage system then determines whether the file is the last new or updated file for this iteration of asynchronous replication (block 607). If the file is not the last new or updated file, operation returns to block 603 to consider the next new or updated file. If the file is the last new or updated file in block 607, then operation for this iteration of asynchronous replication ends (block 608).

Returning to block 605, if the file exists in the remote storage system, the primary storage system determines whether the file is migrated to second tier storage, such as tape (block 609). If the file is not migrated to second tier storage at the remote site, the primary storage system reads the file data (block 610) and computes a hash (block 611). The primary storage system compares the computed hash to a hash received from the remote site to identify delta bytes (block 612). The primary storage system then sends only the delta bytes to the remote site (block 613). Thereafter, the primary storage system determines whether the file is the last file (block 607) and returns to block 603 to consider the next new or updated file, if any, or end operation for this iteration (block 608) if the last file is the last file.

Returning to block 609, if the file is migrated to second tier storage at the remote site, the primary storage system assesses a performance penalty for recalling the file from second tier storage to first tier storage and a penalty for sending excess data (block 614). The primary storage system compares the performance penalty for recall to the performance penalty for sending additional data (block 615). If the performance penalty for recall is greater than the performance penalty for sending additional data in block 616, the primary storage system sends the whole file data (block 606). Thereafter, the primary storage system determines whether the file is the last file (block 607) and returns to block 603 to consider the next new or updated file, if any, or end operation for this iteration (block 608) if the last file is the last file.

If the performance penalty for recall is not greater than the performance penalty for sending additional data in block 616, the primary storage system reads the file data (block 610) and computes a hash (block 611). The primary storage system compares the computed hash to a hash received from the remote site to identify delta bytes (block 612). The primary storage system then sends only the delta bytes to the remote site (block 613). Thereafter, the primary storage system determines whether the file is the last file (block 607) and returns to block 603 to consider the next new or updated file, if any, or end operation for this iteration (block 608) if the last file is the last file.

FIG. 7 is a flowchart illustrating operation of a remote storage system performing asynchronous replication in accordance with an illustrative embodiment. Operation begins for a particular new or updated file identified at the primary site (block 700). The remote storage system checks for existence of the file (block 701). The remote storage system then determines whether the file exists (block 702). If the file does not exist in the remote storage system, then the remote storage system notifies the primary site that the file does not exist at the remote site (block 703). The remote storage system receives the whole file from the primary site (block 704). The remote storage system then writes the file (block 705). The remote storage system defines a synchronization point by taking a snapshot (block 706). Thereafter, operation ends for the current file being replicated (block 707).

Returning to block 702, if the file exists in the remote storage system, then the remote storage system checks the migration status (block 708) and determines whether the file is migrated to second tier storage (block 709). If the remote storage system determines the file is not migrated to second tier storage, then the remote storage system notifies the primary site that the file exists and has not been migrated to second tier storage (block 710). The remote storage system reads the file data (block 711) and computes a hash of the file (block 712). The remote storage system sends the hash to the primary site (block 713). In turn, the remote storage system receives the delta bytes from the primary site (block 714) and merges the delta bytes to the file (block 715). Then, operation proceeds to block 706 to define a synchronization point by taking a snapshot and operation ends (block 707).

Returning to block 709, if the file is migrated to second tier storage at the remote site, then the remote storage system notifies the primary site that the file exists and has been migrated to second tier storage (block 716). The primary storage system determines whether to use whole file or incremental transfer to replicate the file. The remote storage system receives the transfer from the primary site (block 717). The remote storage system determines whether the transfer is incremental (block 718).

If the file transfer is incremental, the remote storage system reads the file data (block 711) and computes a hash of the file (block 712). The remote storage system sends the hash to the primary site (block 713). In turn, the remote storage system receives the delta bytes from the primary site (block 714) and merges the delta bytes to the file (block 715). Then, operation proceeds to block 706 to define a synchronization point by taking a snapshot and operation ends (block 707).

If the file transfer is not incremental in block 718, then the transfer is a whole-file transfer. The remote storage system receives the whole file data from the primary site (block 719). The remote storage system truncates the file at offset 0 (zero) to ensure a recall of the file is not triggered (block 720). Then, operation proceeds to block 705 to overwrite the file. The remote storage system defines a synchronization point by taking a snapshot (block 706). Thereafter, operation ends for the current file being replicated (block 707).

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product comprising a computer readable storage medium having a computer readable program stored therein, wherein the computer readable program, when executed on a computing device, causes the computing device to:

for a given file to be replicated from a primary storage system to a remote storage system, access the remote storage system to determine file existence and migration status at the remote storage system for the given file;

responsive to the primary storage system determining that the given file exists at the remote storage system and has been migrated from first tier storage to second tier storage at the remote storage system, determine a first performance penalty value representing a first performance cost for recall of the given file from the second tier storage to the first tier storage at the remote storage system and a second performance penalty value representing a second performance cost for sending whole file data of the given the from the primary storage system to the remote storage system; and responsive to the primary storage system determining that the first performance penalty is greater than the second performance penalty, send whole file data for the given file from the primary storage system to the remote storage system to replicate the given file at the remote storage system.

2. The computer program product of claim 1, wherein the computer readable program further causes the computing device to:

responsive to the primary storage system determining that the first performance penalty value is not greater than the second performance penalty value, send incremental file data for the given file from the primary storage system to the remote storage system to replicate the given file at the remote storage system, wherein the remote storage system recalls the given file from second tier storage to first tier storage and merges the incremental file data with the recalled file to replicate the given file.

3. The computer program product of claim 2, wherein sending incremental file data comprises:

reading file data for the given file;
computing a hash for the given file;
receiving a hash for the given file from the remote storage system; and
comparing the computed hash to the received hash and identifying delta bytes based on the comparison, wherein the delta bytes are bytes within the given file to be modified to replicate the given file at the remote storage system, wherein the incremental file data comprise the delta bytes.

4. The computer program product of claim 2, wherein sending incremental file data comprises determining the incremental file data by comparing a current version of the given file at a current synchronization point and a previous version of the given file at a previous synchronization point at the primary storage system.

5. The computer program product of claim 2, wherein sending incremental file data comprises accessing a journaling feature at the primary storage system to identify a delta of the given file between two synchronization points.

6. The computer program product of claim 1, wherein the primary storage system determines the second performance penalty value as follows:
(S_fnew/R_net),
wherein S_fhew represents an entire file size of the given the at the primary storage system and wherein R_net represents network transfer throughput obtained from past replications.

7. The computer program product of claim 1, wherein the primary storage system determines the first performance penalty value as follows:
(T_mnt+T_seek+S_fold/R _taperd),
wherein T_mnt represents a time it would take to mount the second tier storage at the remote site, wherein T_seek represents a time it would take to seek the given file in the second tier storage, wherein S_fold represents a size of the given file in the second tier storage, and wherein R_taperd represents a read throughput of the second tier storage.

8. The computer program product of claim 1, wherein the primary storage system determines the first performance penalty value as follows:
((T_mnt+T_seek+S_fold/R_taperd)+(T_hashpri*(S_fnew/S_hashblk))+(T_hashrem*(S_fold/S_hashblk))+((S_hash*(S_fold/S_hashblk)/R_net))),
wherein T_mnt represents a time it would take to mount the second tier storage at the remote site, wherein T_seek represents a time it would take to seek the given file in the second tier storage, wherein S_fold represents a size of the given file in the second tier storage, wherein R_taperd represents a read throughput of the second tier storage, wherein T_hashpri represents an average time to calculate a hash of a block size at the primary storage system, wherein S_fnew represents an entire file size of the given file at the primary storage system, wherein S_hashblk represents block size of the given file at the primary storage system, wherein T_hashrem represents average time to calculate a hash of a block size at the remote storage system, wherein S_hash represents size of the calculated hash, and wherein R_net represents network transfer throughput obtained from past replications.

9. The computer program product of claim 1, wherein the remote storage system truncates the given file at offset 0 to ensure a recall is not triggered for the given file.

10. The computer program product of claim 1, wherein the computer readable program further causes the computing device to:
responsive to the primary storage system determining that the given file exists in first tier storage at the remote storage system, send incremental file data for the given file from the primary storage system to the remote storage system to replicate the given file at the remote storage system, wherein the remote storage merges the incremental file data with the given file in the first tier storage at the remote storage system.

11. The computer program product of claim 1, wherein the computer readable program further causes the computing device to:
responsive to the primary storage system determining that the given file does not exist at the remote storage system, send whole file data for the given file from the primary storage system to the remote storage system to replicate the given file at the remote storage system.

12. A method, in a data processing system, for asynchronous replication in a hierarchical storage management integrated storage system, the method comprising:
for a given file to be replicated from a primary storage system to a remote storage system, accessing the remote storage system to determine file existence and migration status at the remote storage system for the given file;
responsive to the primary storage system determining that the given file exists at the remote storage system and has been migrated from first tier storage to second tier storage at the remote storage system, determining a first performance penalty value representing a first performance cost for recall of the given file from the second tier storage to the first tier storage at the remote storage system and a second performance penalty value representing a second performance cost for sending whole file data of the given file from the primary storage system to the remote storage system; and
responsive to the primary storage system determining that the first performance penalty is greater than the second performance penalty, sending whole file data for the given file from the primary storage system to the remote storage system to replicate the given file at the remote storage system.

13. The method of claim 12, further comprising:
responsive to the primary storage system determining that the first performance penalty value is not greater than the second performance penalty value, sending incremental file data for the given file from the primary storage system to the remote storage system to replicate the given file at the remote storage system, wherein the remote storage system recalls the given file from second tier storage to first tier storage and merges the incremental file data with the recalled file to replicate the given file.

14. The method of claim 13, wherein sending incremental file data comprises:
reading file data for the given file;
computing a hash for the given file;
receiving a hash for the given file from the remote storage system; and
comparing the computed hash to the received hash and identifying delta bytes based on the comparison, wherein the delta bytes are bytes within the given file to be modified to replicate the given file at the remote storage system, wherein the incremental file data comprise the delta bytes.

15. The method of claim 12, wherein the primary storage system determines the second performance penalty value as follows:

(S_fnew/R_net), wherein S_fnew represents an entire file size of the given file at the primary storage system and wherein R_net represents network transfer throughput obtained from past replications.

16. The method of claim 12, wherein the primary storage system determines the first performance penalty value as follows:

(T_mnt+T_seek S_fold/R_taperd), wherein T_mnt represents a time it would take to mount the second tier storage at the remote site, wherein T_seek represents a time it would take to seek the given file in the second tier storage, wherein S_fold represents a size of the given file in the second tier storage, and wherein R_taperd represents a read throughput of the second tier storage.

17. An apparatus comprising:

a processor; and a memory coupled to the processor, wherein the memory comprises instructions which, when executed by the processor, cause the processor to:

for a given file to be replicated from a primary storage system to a remote storage system, access the remote storage system to determine file existence and migration status at the remote storage system for the given file;

responsive to the primary storage system determining that the given file exists at the remote storage system and has been migrated from first tier storage to second tier storage at the remote storage system, determine a first performance penalty value representing a first performance cost for recall of the given file from the second tier storage to the first tier storage at the remote storage system and a second performance penalty value representing a second performance cost for sending whole file data of the given file from the primary storage system to the remote storage system; and responsive to the primary storage system determining that the first performance penalty value is greater than the second performance penalty value, send whole file data for the given file from the primary storage system to the remote storage system to replicate the given file at the remote storage system.

18. The apparatus of claim 17, wherein the instructions further cause the processor to:

responsive to the primary storage system determining that the first performance penalty value is not greater than the second performance penalty value, send incremental file data for the given file from the primary storage system to the remote storage system to replicate the given file at the remote storage system, wherein the remote storage system recalls the given file from second tier storage to first tier storage and merges the incremental file data with the recalled file to replicate the given file.

19. The apparatus of claim 18, wherein sending incremental file data comprises:

reading file data for the given file;

computing a hash for the given file;

receiving a hash for the given file from the remote storage system; and comparing the computed hash to the received hash and identifying delta bytes based on the comparison, wherein the delta bytes are bytes within the given file to be modified to replicate the given file at the remote storage system, wherein the incremental file data comprise the delta bytes.

20. The apparatus of claim 17, wherein the instructions further cause the processor to:

responsive to the primary storage system determining that the given file exists in first tier storage at the remote storage system, send incremental file data for the given file from the primary storage system to the remote storage system to replicate the given file at the remote storage system, wherein the remote storage merges the incremental file data with the given file in the first tier storage at the remote storage system.

* * * * *